United States Patent [19]

Tabisz et al.

[11] Patent Number: 4,857,822
[45] Date of Patent: Aug. 15, 1989

[54] ZERO-VOLTAGE-SWITCHED MULTI-RESONANT CONVERTERS INCLUDING THE BUCK AND FORWARD TYPE

[75] Inventors: Wojciech A. Tabisz; Fred C. Lee, both of Blacksburg, Va.

[73] Assignee: Virginia Tech Intellectual Properties, Inc., Blacksburg, Va.

[21] Appl. No.: 179,926

[22] Filed: Apr. 11, 1988

Related U.S. Application Data

[63] Continuation-in-part of Ser. No. 99,965, Sep. 23, 1987, Pat. No. 4,841,220.

[51] Int. Cl.[4] .............................................. G05F 1/56
[52] U.S. Cl. .................................... 323/282; 323/235; 363/16; 363/40; 363/127
[58] Field of Search ............... 323/235, 271, 282, 283, 323/284, 285, 286, 287, 290; 363/16, 39, 40, 44-48, 127

[56] References Cited

U.S. PATENT DOCUMENTS

| | | | |
|---|---|---|---|
| 4,399,499 | 8/1983 | Butcher et al. | 363/127 |
| 4,449,174 | 5/1984 | Ziesse | 363/40 |
| 4,605,999 | 8/1986 | Bowman et al. | 363/40 |
| 4,716,514 | 12/1987 | Patel | 363/127 |
| 4,720,667 | 1/1988 | Lee et al. | 323/271 |
| 4,720,668 | 1/1988 | Lee et al. | 323/271 |

*Primary Examiner*—Peter S. Wong
*Attorney, Agent, or Firm*—Mason, Fenwick & Lawrence

[57] ABSTRACT

A multi-resonant-switching network that operates under switching conditions that are favorable to both the active switch and the diode that constitute the switch. In a zero-current multi-resonant switch, the resonant circuit is formed in a T-network with resonant inductors in series with the switching devices. In a zero-voltage multi-resonant switch, the resonant circuit is formed in a π-network with resonant capacitors connected in parallel with the switch. In this way, the two networks are dual. During operation of a multi-resonant converter, a multi-resonant switches forms three different resonant circuits depending on whether the active switch and diode are open or closed. This results in operation of the converter with three different resonant stages in one cycle of operation. In practicing the present invention, certain rules are applied to derive a ZVS-MRC from a PWM converter. In particular, one resonant capacitor is placed in parallel with the active switch, which may be either uni-directional or bi-directional, another resonant capacitor is placed in parallel with the rectifying diode, and an inductor is inserted in the loop containing the switch and the diode. This loop can also contain voltage sources and filter or blocking capacitors. Improvement in the operation of ZVS-MRCs is obtained with synchronous rectification which is achieved by replacing rectifying diodes in a DC/DC converter with active devices, called synchronous rectifiers.

4 Claims, 11 Drawing Sheets

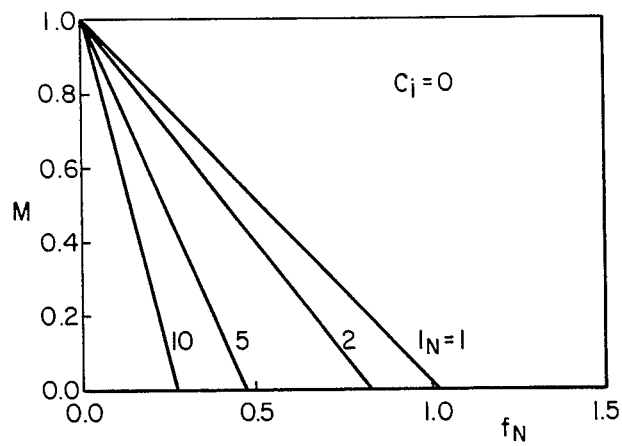
FIG. 5a
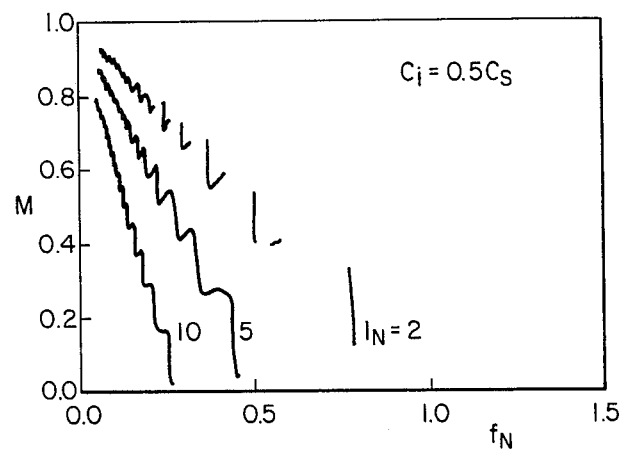
FIG. 5b
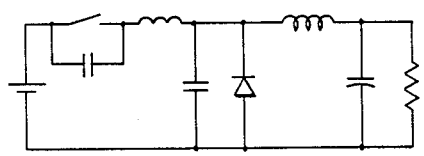
FIG. 7a  BUCK
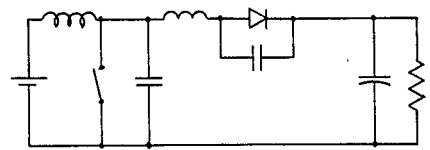
FIG. 7b  BOOST
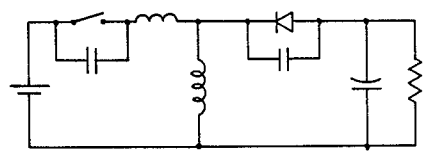
FIG. 7c  BUCK-BOOST
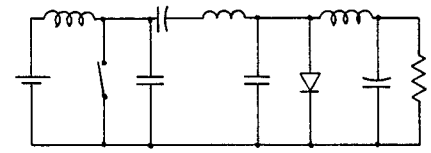
FIG. 7d  CUK
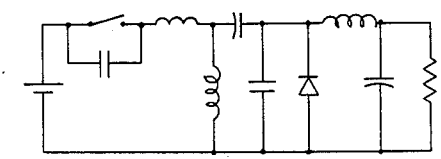
FIG. 7e  ZETA
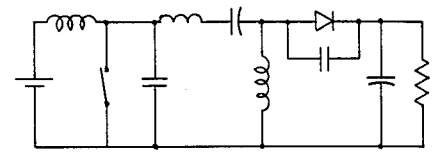
FIG. 7f  SEPIC

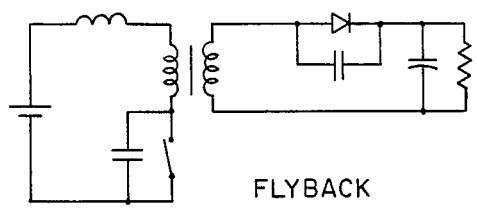
FIG. 8a  FLYBACK
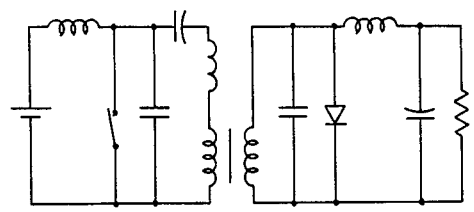
FIG. 8b  CUK
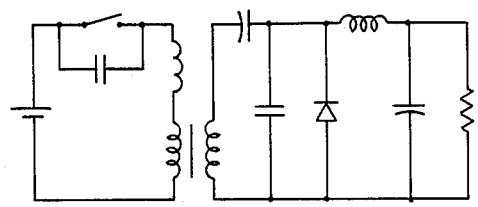
FIG. 8c  ZETA
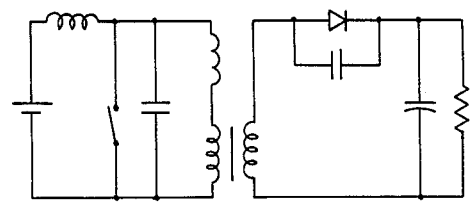
FIG. 8d  SEPIC
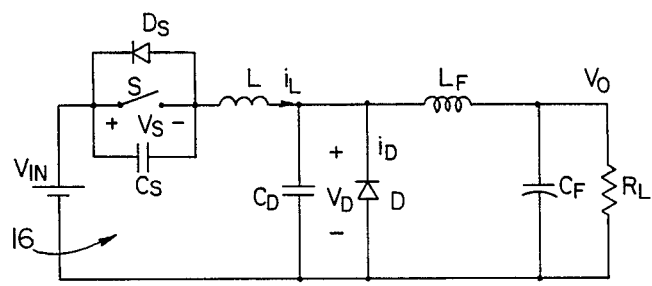
FIG. 9
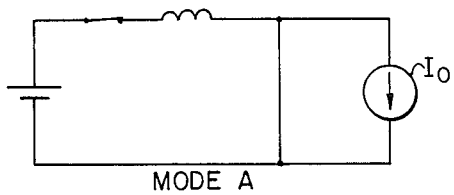
MODE A
FIG. 11a
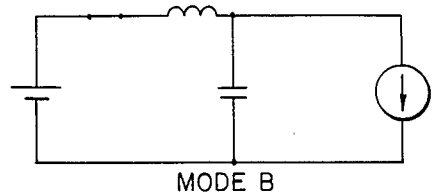
MODE B
FIG. 11b
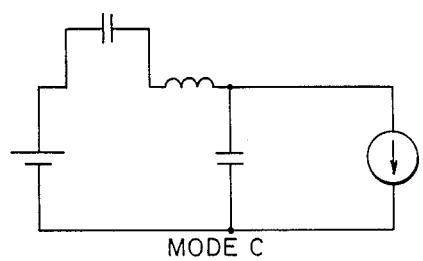
MODE C
FIG. 11c
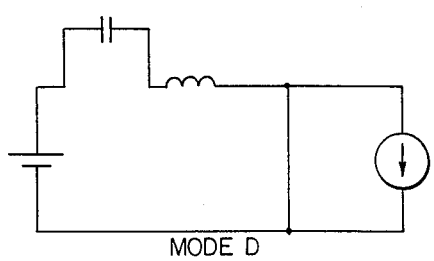
MODE D
FIG. 11d

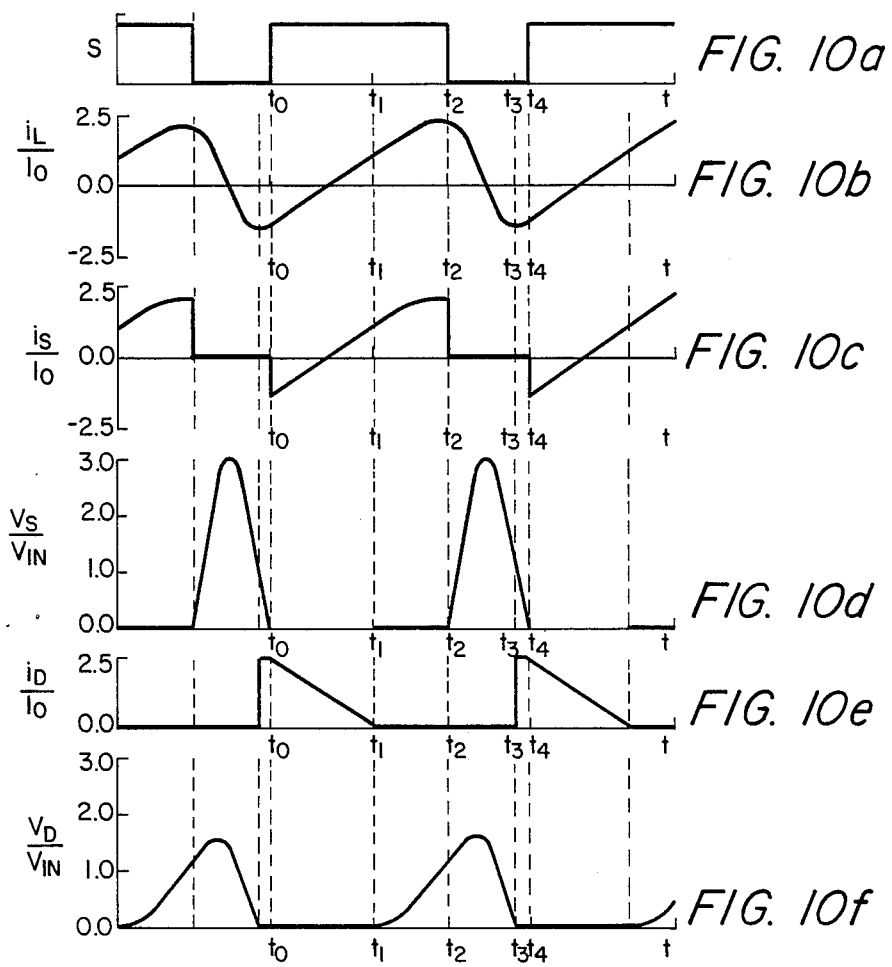
FIG. 10a
FIG. 10b
FIG. 10c
FIG. 10d
FIG. 10e
FIG. 10f
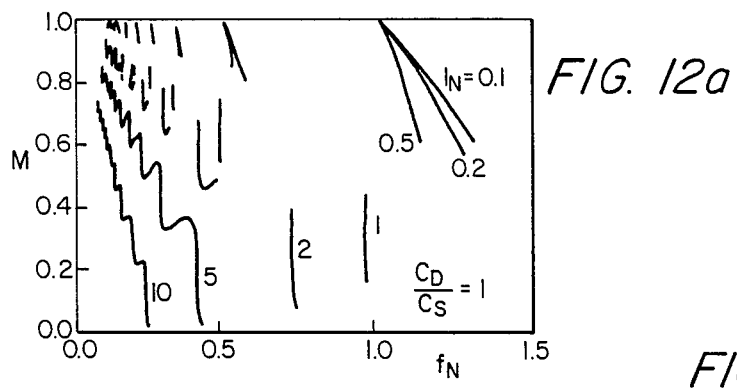
FIG. 12a
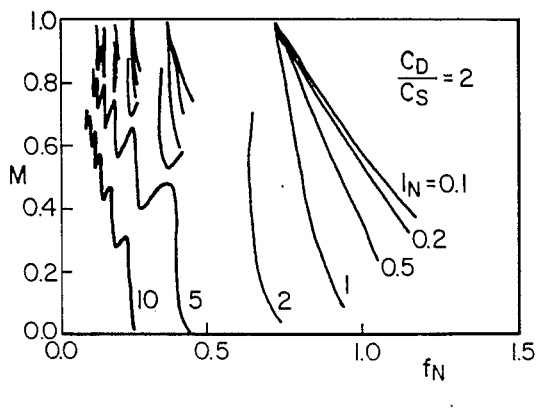
FIG. 12b
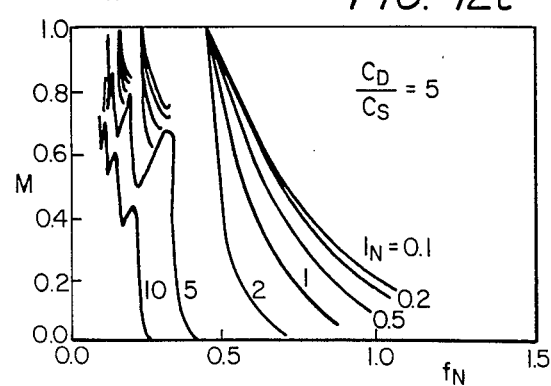
FIG. 12c

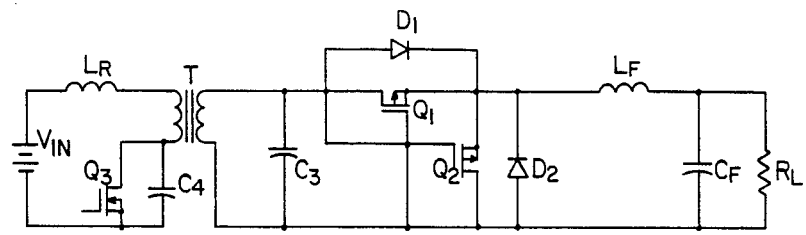
*FIG. 25a*
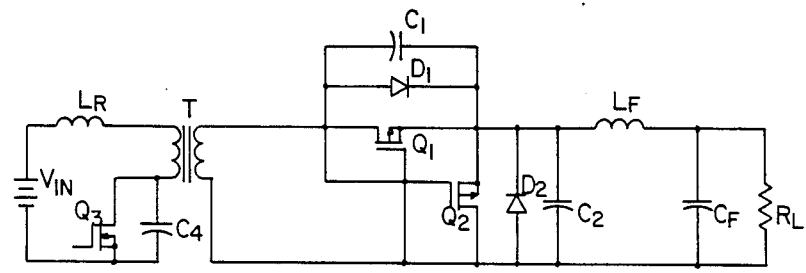
*FIG. 25b*
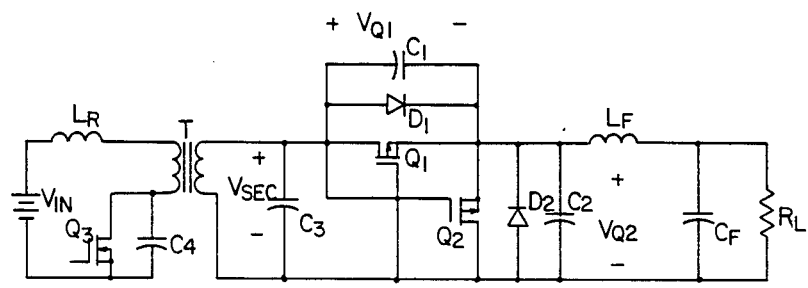
*FIG. 25c*
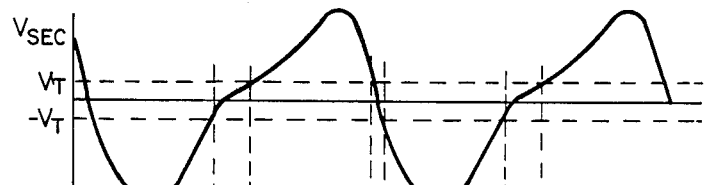
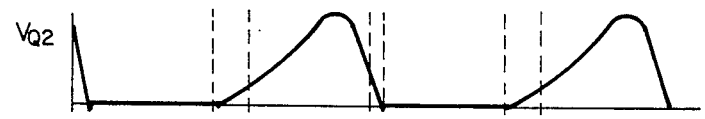
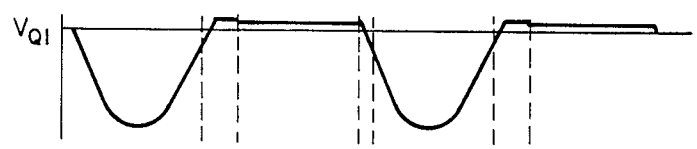
*FIG. 26*
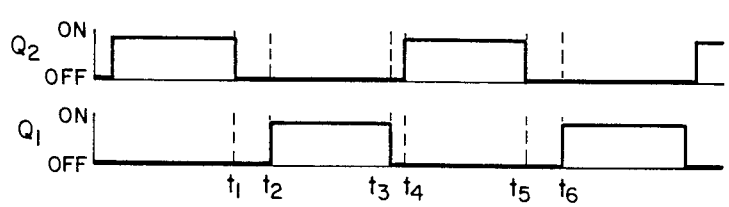

ZERO-VOLTAGE-SWITCHED MULTI-RESONANT CONVERTERS INCLUDING THE BUCK AND FORWARD TYPE

DISCUSSION OF RELATED APPLICATION

The present invention is a continuation-in-part of U.S. Ser. No. 99,965, filed Sept. 23, 1987, now U.S. Pat. No. 4,841,220 and incorporated by reference herein.

FIELD OF THE INVENTION

The present invention relates to multi-resonant converters, in general, and to buck and forward type multi-resonant converters, in particular.

BACKGROUND OF THE INVENTION

The need for high-frequency power conversion has prompted research in quasi-resonant converters employing zero-current and zero-voltage-switching techniques.

Zero-current-switched quasi-resonant converters (ZCS-QRCs) reduce turn-off losses by shaping the switching transistor current to zero prior to turn-off. This allows ZCS-QRCs to operate at frequencies up to about 2 MHz. Further increase of the switching frequency of ZCS-QRCs is difficult to accomplish because of capacitive turn-on loss. Also, the Miller effect comes into play in that it relates to turn-on of the transistor at non-zero-voltage and the resultant parasitic oscillations caused by the output capacitance of the transistor.

See U.S. Pat. No. 4,720,667 (Lee et al) for several examples of zero-current-switched quasi-resonant converters.

Zero-voltage-switched quasi-resonant converters reduce the problem of turn-off losses by shaping the switching transistor voltage to zero prior to turn-on. As a result, ZVS-QRCs can operate at higher frequencies, up to 10 MHz. However, the ZVS-QRCs have two major limitations. One problem is excessive voltage stress to the switching transistor proportional to the load range. This makes it difficult to implement ZVS-QRCs with wide load variations. Another problem is caused by the junction capacitance of the rectifying diode used in the quasi-resonant converter. When the diode turns off, this junction capacitance oscillates with the resonant inductance. If damped, these oscillations cause significant power dissipation at high frequencies; undamped, they adversely affect the voltage gain of the quasi-resonant converter and, thus, the stability of the closed-loop system.

See U.S. Pat. No. 4,720,668 (Lee et al) for several examples of zero-voltage-switched quasi-resonant converters.

FIGS. 1a and 1b show the equivalent circuits of prior art zero-current and zero-voltage quasi-resonant switches. Each of these topologies represents a high-frequency sub-circuit extracted from a quasi-resonant converter by replacing voltage sources and filter capacitors with short circuits and filter inductors with open circuits. In the equivalent circuit of the zero-current quasi-resonant switch, shown in FIG. 1a, the active switch S operates in series with the resonant inductor L while the diode D operates in parallel with the resonant capacitor $C_D$. In the zero-voltage quasi-resonant switch shown in FIG. 1b, the situation is opposite. The active switch S is in parallel with the capacitor $C_S$ and the diode D is in series with the inductor L. It can be easily seen that the two topologies are dual.

FIG. 2 shows the circuit diagram of a buck ZCS-QRC. This topology is derived from a pulse width modulation (PWM) buck converter by inserting a resonant inductor L in series with the switch S and a resonant capacitor $C_D$ in parallel with the diode D. Anti-parallel diode $D_S$ represents the body diode of a metal oxide semiconductor field effect transistor (MOSFET) which is typically used as the high-frequency switch S. The filter in the output stage is formed by inductor $L_F$ and capacitor $C_F$. Resistor $R_L$ represents the load.

When switch S is conducting, inductor L and capacitor $C_D$ resonate. Current through switch S is sinusoidal and reduces to zero before switch S is turned off. This, in theory, eliminates losses related to inductive turn-off. In practice, however, reverse recovery of the body diode of the MOSFET causes harmful oscillation between the resonant inductor and output capacitance of the MOSFET. To avoid this oscillation, a diode is added in series with switch S to prevent the current from flowing into diode $D_S$. The resulting half-wave mode of operation not only increases conduction losses, but also makes the converter load-sensitive. The minimum switching frequency at light load is reduced substantially and leads to larger filter components and slower transient response.

Although ZCS-QRCs take advantage of zero-current turn-off, turn-on occurs when full input voltage is applied to the switch. This causes dissipation of the energy stored in the output capacitance of the switch and change in voltage per unit time (dv/dt) noise which is coupled through the drain-to-gate capacitance of the power MOSFET to the gate-drive circuit (switching Miller effect).

In ZCS-QRCs, the switching conditions for the active device are not of the most favorable variety. However, switching conditions for the rectifying diode on the other hand, are very favorable. The reason for this is that power diodes are easy to turn on, but the reverse recovery characteristics of such devices often result in excessive turn-off loss and noise. The most favorable condition to turn off a diode occurs when current reduces gradually to zero and no immediate reverse voltage is applied to the diode afterwards. This is the case for ZCS-QRCs. Again, with reference to FIG. 2, when switch S is turned on, the current through diode D decreases linearly until it reaches zero. Then the diode turns off and the voltage across it builds up gradually in a resonant fashion. The only disadvantage is that the reverse voltage applied across the diode is approximately twice the input voltage. The maximum switching frequency of ZCS-QRCs is limited due to the turn-on switching loss in the active switch.

The ZVS-QRC topology, shown in FIG. 3, is derived from its pulse-width-modulation (PWM) counterpart by adding a resonant capacitor $C_S$ in parallel with the switch S and a resonant inductor L in series with the diode D. The inductor can be placed anywhere in the resonant loop provided the resonant switch, extracted from the circuit, is always reduced to the topology of FIG. 1b. in the ZVS-QRC of FIG. 3, the active switch operates under favorable switching conditions. At turn-off, the current is diverted from the switch into the resonant capacitor $C_S$ which is, subsequently, being charged linearly to the input voltage by the load current flowing through L and $L_F$. The gradual increase of $V_S$ minimizes overlapping of the switch current and voltage at turn-off, thus, reducing the switching losses. The turn-on condition is even better, since the voltage across the switch resonates and reduces to zero prior to turn-on. This turn-on condition totally eliminates the capacitive turn-on losses and the switching Miller effect associated with ZCS-QRCs.

Improved switching conditions for the active switch S allow ZVS-QRCs to operate at 10 MHz. However, the operation of ZVS-QRCs is adversely affected by the undesired switching conditions created for the rectifying diode. In particular, immediately after the diode current reduces to zero, voltage applied to the diode changes abruptly from zero to $V_{IN}$. Such an abrupt voltage change induces parasitic oscillations between the resonant inductor and diode capacitance. During conduction of switch S, the current through the switch and voltage across the diode are oscillatory. In practice, these oscillations typically do not decay before switch S is turned off, as shown in FIGS. 4a and 4b, which respectively show the theoretical and experimental voltage waveform of the rectifying diode in the ZVC-QRC of the type shown in FIG. 3. The undesired oscillation adversely affects the conversation ratio characteristics. FIGS. 5a and 5b are waveforms illustrating the effect of parasitic junction capacitance $C_j$ of the rectifying diode on the DC conversion ratio characteristics of the buck ZVS-QRC of FIG. 3. FIG. 5a shows the ideal characteristics at $C_j=0$ and FIG. 5b shows the characteristics at $C_j=0.5\ C_S$.

In each graph, M represents the conversion ratio $V_O/V_{IN}$ and $f_N$ represents the normalized frequency $f/f_S$, where $f_S = \frac{1}{2}\pi\sqrt{LC_S}$, with normalized output current, $I_N$ being equal to $I_O\sqrt{L/C_S}/V_{IN}$ as a free running parameter. When the junction capacitance $C_j$ of the rectifying diode $D_S$ is assumed to be zero, the characteristics are shown as straight lines in FIG. 5a. FIG. 5b shows characteristics for $C_j=0.5\ C_S$. It can be seen that even if junction capacitance $C_j$ is only half of the resonant capacitance $C_S$, its effects are quite pronounced, for example, in high-frequency converters, the junction capacitance $C_j$ can easily be larger than $C_S$, especially if high-current diodes with large die areas are used. The discontinuity of the characteristics implies that the zero-voltage-switching property is lost for some operating conditions. Furthermore, in regions where the slopes of the curves are positive, the converter exhibits local closed-loop instabilities. Even in those regions where the slopes are negative, the slope can be very steep which makes the conversion ratio very sensitive to the switching frequency and, thus, difficult to control.

Another important concern of ZVS-QRCs is extensive voltage stress at the switching transistor. Typically, this stress is proportional to the load range. For example, in a buck ZVS-QRC, this stress is $V_{Smax}=V_{IN}(1+R_{Lmax}/R_{Lmin})$. Thus, for a load range of 10:1, voltage stress is 11 times the input voltage.

In the above discussion, it has been shown the zero-current-switched and zero-voltage-switched quasi-resonant techniques optimize switching conditions for either the active switch or the diode, but not for both simultaneously. Furthermore, each application is limited primarily by the undesired parasitic oscillations in the circuit. The ZCS-QRCs are adversely affected by the body diode and output capacitance of the power MOSFET, while the ZVS-QRCs deteriorate due to the junction capacitance of the rectifying diode.

There is thus a need for a resonant switching network that operates under switching conditions that are favorable to both the active switch and the diode. The present invention is directed toward filling that need.

SUMMARY OF THE INVENTION

The present invention relates to a multi-resonant-switching network that operates under switching conditions that are favorable to both the active switch and the diode that constitute the switch. In a zero-current multi-resonant switch, the resonant circuit is formed in a T-network with resonant inductors in series with the switching devices. In a zero-voltage multi-resonant switch, the resonant circuit is formed in a $\pi$-network with resonant capacitors connected in parallel with the switch. In this way, the two networks are dual.

During operation of a multi-resonant converter, a multi-resonant switch forms three different resonant circuits depending on whether the active switch and diode are open or closed. This results in operation of the converter with three different resonant stages in one cycle of operation.

In practicing the present invention, certain rules are applied to derive a ZVS-MRC from a PWM converter. In particular, one resonant capacitor is placed in parallel with the active switch, which may be either uni-directional or bi-directional, another resonant capacitor is placed in parallel with the rectifying diode, and an inductor is inserted in the loop containing the switch and the diode. This loop can also contain voltage sources and filter or blocking capacitors.

Low voltage stress with a very wide load range is one of the salient features of ZVS-MRCs. The voltage stress in a quasi-resonant converter is proportional to the load range. For the converter with 10:1 load range the voltage stress at full load is 11 times the input voltage. The multi-resonant converter achieves operation from no-load to full-load with the voltage stress only about three times the input voltage.

A novel, multi-resonant switch concept is proposed to overcome the limitations of high-frequency quasi-resonant converters. A new family of zero-voltage-switching multi-resonant converters is generated. The new converters operate with favorable switching conditions for both the transistor and rectifying diode. Transistor voltage stress in ZVS-MRCs is significantly reduced compared to that in ZVS-QRCs, while the load range is markedly improved. By limiting the switching frequency range, the ZVS-MRCs can avoid instability found in ZVS-QRCs caused by the parasitic oscillation between the junction capacitance of the rectifier and the resonant inductance. In fact, in ZVS-MRCs, the junction capacitance of the rectifier is used as a part of the resonant circuit. As a result, high-current diodes with large junction capacitance can be used to reduce conduction losses in the rectifier. Due to the unique arrangement of the resonant circuit that absorbs all parasitic reactances including transistor output capacitance, diode junction capacitance and transformer leakage inductance, the ZVS-MRCs are suitable for high-density on-board and off-line power supplies operating above one MHz.

The multi-resonant forward converter topology incorporating the teachings of the present invention has the following advantages not found simultaneously in any of the previous forward topologies:

Zero-voltage-switching of both the power transistor and rectifying diodes.

Complete absorption of all essential parasitic reactances of the power circuit including:

primary and secondary leakage of the transformer;
output capacitance of the MOSFET;
junction capacitances of the rectifiers; and wiring and packaging inductances.

Automatic resetting of the transformer eliminating external reset circuits.

Due to its simplicity and high-frequency operation, the inventive converter is particularly suited for high-density on-board power supplies. A forward ZVS-MRC incorporating the teachings of the present invention was built for an on-board power supply application with 50 V input and 5 V output voltage. The converter operated from no-load to 50 W with 79.4% efficiency at full-load. The switching frequency ranged from 4.83 MHz at full load to 7.22 MHz at no-load.

Improvement in the operation of ZVS-MRCs is obtained with synchronous rectification which is achieved by replacing rectifying diodes in a DC/DC converter with active devices, called synchronous rectifiers. Typically, a synchronous rectifier uses a low-on-resistance MOSFET device operating in a reverse-saturated region. The advantage of synchronous rectification over conventional rectification using diodes is lower power dissipation accomplished by using devices with low on-resistance resulting in lower voltage drop across the synchronous rectifier than the corresponding voltage drop across a diode.

Since a synchronous rectifier is an active device, it requires a drive circuit similar to that used to operate a power MOSFET. This results in an unnecessary complication of the converter circuitry. To control a synchronous rectifier, its input capacitance has to be charged and discharged. Typically, this results in a power dissipation in the drive circuit proportional to the input capacitance of the synchronous rectifier and the switching frequency. At high switching frequencies, power dissipation in the drive circuit may become comparable or even larger than the power dissipation saved by replacing a diode with a synchronous rectifier.

The aforementioned disadvantages of synchronous rectification can be overcome if the synchronous rectifier is used in a circuit that uses the capacitance of the rectifier as a resonant component. The zero-voltage-switched multi-resonant forward converter is an example of such a circuit.

It is thus a primary object of the present invention to provide an improved multi-resonant converter for use in high-frequency power conversion.

It is another object of the present invention to provide a novel zero-voltage-controlled buck multi-resonant converter.

It is still another object of the present invention to provide a novel zero-voltage-controlled forward multi-resonant converter.

It is yet an object of the present invention to provide an improved multi-resonant converter employing synchronous rectification.

It is a further object of the present invention to provide a multi-resonant converter with zero-voltage-switching of both the power transistor and rectifying diodes.

It is still another object of the present invention to provide a multi-resonant converter able to absorb essentially all parasitic reactances of the power circuit.

It is yet a further object of the present invention to provide a forward multi-resonant circuit having automatic resetting of the converter transformer.

These and other objects and advantages will become apparent when the following detailed description is read in connection with the following drawings.

BRIEF DESCRIPTION OF THE DRAWINGS

FIGS. 5a and 5b are conversion-ratio characteristics showing the effect of parasitic junction capacitance $C_j$ of the rectifying diode for the buck zero-voltage-switched quasi-resonant converter of FIG. 3.

FIGS. 7a through 7f are schematic diagrams of six basic topologies for zero-voltage-switched multi-resonant converters.

FIGS. 8a through 8d are schematic diagrams for four basic isolated topologies of zero-voltage-switched multi-resonant converters.

FIG. 9 is a schematic diagram of a circuit for a buck zero-voltage-switched multi-resonant converter.

FIGS. 10a through 10f are waveforms used to explain the operation of the buck zero-voltage-switched multi-resonant converter of FIG. 9.

FIGS. 11a through 11d are schematic diagrams of topological modes of the ZVS-MRCs of FIG. 9.

FIGS. 12a through 12c are the conversion ratio characteristics of the buck ZVS-MRC of showing the effect of the ratio $C_D/C_S$.

In FIG. 13a, the characteristic is the DC conversion ratio and, in FIG. 13b, the characteristic is the transistor voltage stress with $C_D/C_S=3$.

FIG. 19a shows the basic topology rising from introduction of a transformer and a forward diode in a buck ZVS-MRC. FIG. 19b shows both primary and secondary leakage inductances included in the resonant tank. FIG. 19c shows the resonant capacitor placed across the rectifying diodes without changing the circuit's operation. FIG. 19d shows the package inductances of the diodes included in the resonant tank.

FIGS. 25a through 25c are schematic diagrams showing a preferred embodiment of a forward ZVS-MRC with synchronous rectifiers and various positions for the resonant capacitors.

FIG. 26 shows the operating waveforms of the forward ZVS-MRC with synchronous rectifiers.

DETAILED DESCRIPTION OF THE PREFERRED EMBODIMENTS

Figure 1A:
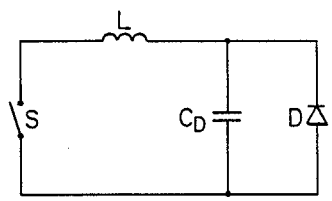
FIG. 1a is a schematic diagram of an equivalent circuit of a zero-current quasi-resonant switch.

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As explained before, the zero-current and zero-voltage resonant-switch concepts were originally developed to provide improved switching conditions for the active switch. Examination of FIGS. 1a and 1b reveals that zero-current configuration for the active switch is zero-voltage configuration for the diode and vice-versa. As mentioned previously, each quasi-resonant network creates favorable switching conditions for either the active switch or the diode, but not both.

Figure 6A:
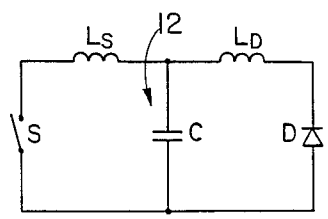
FIG. 6a is a circuit diagram for a zero-current multi-resonant switch.
Figure 6B:
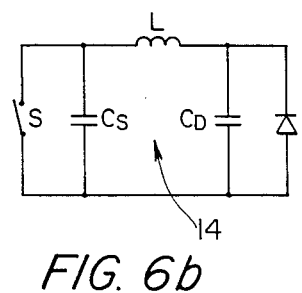
FIG. 6b is a circuit diagram for a zero-voltage multi-resonant switch.

The basic idea of multi-resonant switches is to extend the resonant-switch concept to both the active switch and the diode in a resonant switching network. FIGS. 6a and 6b show the two simplest multi-resonant switches. In the zero-current multi-resonant switch, shown in FIG. 6a, the resonant circuit is formed in a T-network 12 with resonant inductor $L_S$ in series with the switching device S and resonant inductor $L_D$ in series with diode D. In the zero-voltage multi-resonant switch, shown in FIG. 6b, the resonant circuit is formed in a $\pi$-network 14 with resonant capacitor $C_S$ connected in parallel with the switch S and resonant capacitor $C_D$ in parallel with diode D. It can be easily seen that the two networks are dual. During operation of a multi-resonant converter, a multi-resonant switch forms three different resonant circuits depending on whether the active switch and diode are open or closed. This results in operation of the converter with three different resonant stages in one cycle of operation.

For high-frequency operation, the zero-voltge topology of FIG. 6b is advantageous. This topology absorbs parasitic output capacitance of the power FET forming switch S and the junction capacitance of the rectifying diode D and provides favorable switching conditions for both devices, as will be shown later.

The procedure for converting any pulse-width-modulated (PWM) topology will now be described in connection with a specific design with the realization that the concepts may be applied to several types of pulse-width-modulated topologies. By way of example, to derive a ZVS-MRC from a PWM converter, the following steps are applied:

1. One resonant capacitor is placed in parallel with the active switch, which may be either uni-directional or bi-directional.

2. Another resonant capacitor is placed in parallel with the rectifying diode.

3. An inductor is inserted in the loop containing the switch and the diode. This loop can also contain transformers, voltage sources and filter or blocking capacitors.

Applying the above rules to six basic converter topologies, the corresponding ZVS-MRC topologies, shown in FIGS. 7a through 7f, are obtained. In a similar manner following the same rules, four transformer isolated ZVS-MRCs, shown in FIGS. 8a through 8d, can be generated. In all the isolated converters of FIGS. 8a through 8d, the resonant inductance can be supplied by the leakage inductance of the transformer. It should also be noted that in the isolated ZVS-MRCs, the resonance of the switch current and diode voltage is achieved using the secondary-side resonance of the transformer.

Although a large variety of MRCs exists, their operation and characteristics are generally similar. For this reason, the buck ZVS-MRC topology of FIG. 7a is analyzed to gain insight in the operation and performance of ZVS-MRCs. FIG. 9 shows a circuit diagram of the converter 16, whereas FIGS. 10a through 10f show the circuit's typical waveforms. During a switching cycle, the converter 16 operates in four topological modes, shown in FIGS. 11a through 11d. The output-filter, inductor $L_f$, is assumed to be sufficiently large to be replaced by current souce $I_O$.

The first topological Mode A ($t_0$, $t_1$—as shown in FIG. 10) arises when the switch S is conducting and the resonant inductor current is less than $I_O$. This forces differential current $I_O-i_L$ to flow through rectifying diode D. The resonant-inductor current and the resonant-capacitor voltages are as follows:

$$i = \frac{V_I}{L} t + i(t_o) \tag{1a}$$

$$v_S = 0 \tag{1b}$$

$$v_D = 0 \tag{1c}$$

In topological Mode B ($t_1$, $t_2$), the resonant-inductor current reaches $I_O$. When this happens, diode D turns off and the resonance of L and $C_D$ begins. The resonant current and voltages during this mode are as follows:

$$i = [V_{IN} - v_D(t_1)] \frac{1}{Z_D} \sin\omega_D t + [i(t_1) - I_o]\cos\omega_D t + I_o \tag{2a}$$

-continued
$$v_S = 0 \quad (2b)$$

$$v_D = V_{IN}(1 - \cos\omega_D t) + v_D(t_1)\cos\omega_D t + Z_D[i(t_1) - I_o]\sin\omega_D t \quad (2c)$$

where:

$$\omega_D = \frac{1}{\sqrt{LC_D}} \quad (2d)$$

$$Z_D = \sqrt{\frac{L}{C_D}} \quad (2e)$$

Topological Mode B ends when switch S is turned off. The operation of the circuit now moves into topological Mode C ($t_2$, $t_3$) where all three resonant components form a resonant circuit with current and voltages described by the following expressions:

$$i = i(t_2)\cos\omega_{SD}t - \omega_{SD}C_S v_S(t_2)\sin\omega_{SD}t + \frac{I_o C_S}{C_S + C_D} \quad (3a)$$

$$\left(1 - \cos\omega_{SD}t + \left[V_{IN} - v_D(t_2) + \frac{C_S}{C_D} v_D(t_2)\right]\frac{1}{Z}\sin\omega_{SD}t\right)$$

$$v_S = v_S(t_2)\cos\omega_{SD}t + \frac{1}{\omega_{SD}C_S} i(t_2)\sin\omega_{SD}t + \frac{I_o t}{C_S + C_D} - \quad (3b)$$

$$\frac{1}{\omega_{SD}} \frac{I_o}{C_S + C_D} \sin\omega_{SD}t + \left[V_{IN} - v_D(t_2) + \frac{C_S}{C_D} v_S(t_2)\right]$$

$$\frac{C_D}{C_S + C_D}(1 - \cos\omega_{SD}t)$$

$$v_D = v_D(t_2) + v_S(t_2)\frac{C_S}{C_D}\cos\omega_{SD}t + \frac{1}{\omega_{SD}C_D} i(t_2)\sin\omega_{SD}t + \quad (3c)$$

$$\left[V_{IN} - v_D(t_2) + \frac{C_S}{C_D} v_S(t_2)\right]\frac{C_S}{C_S + C_D}(1 - \cos\omega_{SD}t) -$$

$$\frac{I_o t}{C_S + C_D} - \frac{C_S}{C_D} v_S(t_2) - \frac{I_o}{\omega_{SD}C_D} \frac{C_S}{C_S + C_D}\sin\omega_{SD}t$$

where:

$$\omega_{SD} = \frac{1}{\sqrt{LC}} \quad (3d)$$

$$Z = \sqrt{\frac{L}{C}} \quad (3e)$$

$$C = \frac{C_S C_D}{C_S + C_D} \quad (3f)$$

Finally, topological Mode D ($t_3$, $t_4$) begins when voltage $V_D$ reduces to zero and diode D turns on. During this stage, the current and voltages of the resonant circuit are as follows:

$$i = [V_{IN} - v_S(t_3)]\frac{1}{Z_S}\sin\omega_S t + i(t_3)\cos\omega_S t \quad (4a)$$

$$v_S = v_S(t_3)\cos\omega_S t + Z_S i(t_3)\sin\omega_S t + V_{IN}(1 - \cos\omega_S t) \quad (4b)$$

$$v_D = 0 \quad (4c)$$

where:

$$\omega_S = \frac{1}{\sqrt{LC_S}} \quad (4d)$$

$$Z_S = \sqrt{\frac{L}{C_S}} \quad (4e)$$

The cycle is completed when $V_S$ reduces to zero and switch S turns on starting Mode A.

Equations (1) through (4) were used in a numerical procedure to find the DC conversion ratio characteristics, shown in FIGS. 12a through 12c for the converters of FIG. 9. The conversion ratio is as follows:

$$M = \frac{V_o}{V_{IN}} \quad (5)$$

is shown as a function of the normalized switching frequency $$f_N = \frac{f}{f_S} \quad (6)$$

where $f_S = \omega_S/(2\pi)$. In the several examples, the normalized output current $$I_N = \frac{I_o Z_S}{V_{IN}} \quad (7)$$

is a free-running parameter.

FIG. 12a shows conversion ratio characteristics for the multi-resonant converter 16 with $C_D/C_S=1$. For heavy loads, $I_N>1$, the characteristics are similar to those of the buck ZVS-QRC, as shown in FIG. 6b. However, for lighter loads, $I_N \leq 1$, the characteristics are quite different. converter 16, achieves zero-voltage switching even for very light loads, which is manifested by the presence of the characteristics for $I_N \leq 1$.

When the conversion ratio $C_D/C_S$ is increased, zero-voltage-switching is achieved for a wider range of operating conditions, as shown in FIG. 12b and FIG. 12c for $C_D/C_S=2$ and $C_D/C_S=5$, respectively.

Figure 13A:
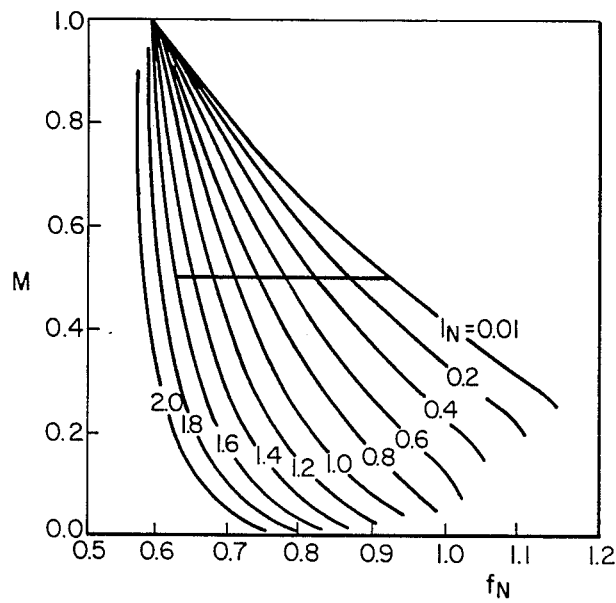
FIGS. 13a and 13b are graphs showing the operating point loci of the buck ZVS-MRC of FIG. 9 with $M=0.5$ and $I_N$ varying from 0 to 1.66 superimposed on its characteristics.
Figure 13B:
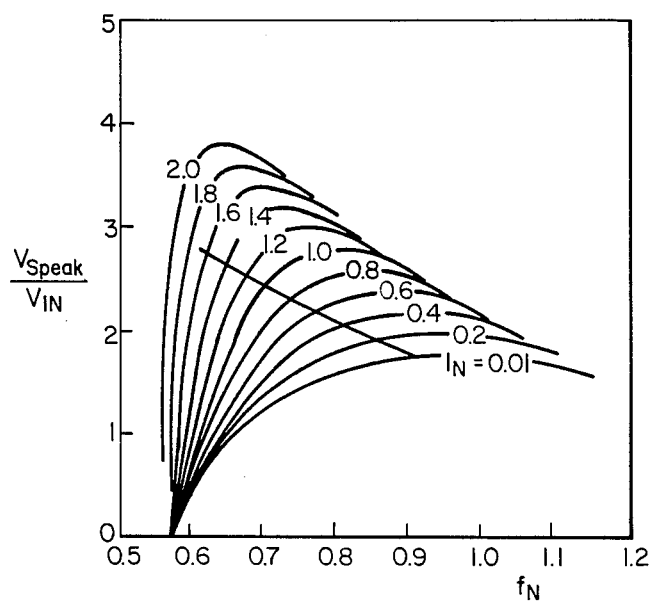

From FIGS. 12a through 12c, it can be seen that if the switching frequency is limited to a certain range, it is possible to assure that the operating point is always within the region where the characteristics have a negative slope. This allows the ZVS-MRCs to overcome the instability found in ZVS-QRCs. For example, FIG. 13a shows DC conversion ratio characteristics of the buck ZVS-MRC 16 with $C_D/C_S=3$ for a limited range of switching frequency, $f_N>0.5$. The line superimposed on the characteristics depicts the locus of the operating point for $M=0.5$ and $I_N$ varying from 0 to 1.66. FIG. 13b shows corresponding plots of voltage stress applied to the active switch S. The voltage stress is less than 3 $V_{IN}$ for all loads at $M=0.5$.

Figure 3:
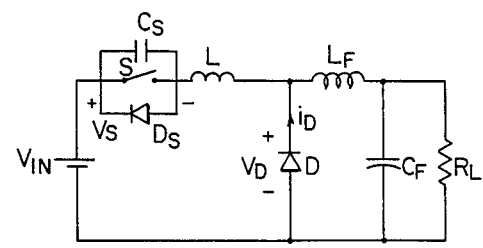
FIG. 3 is a schematic circuit diagram of a buck zero-voltage-switched quasi-resonant converter.
Figure 4A:
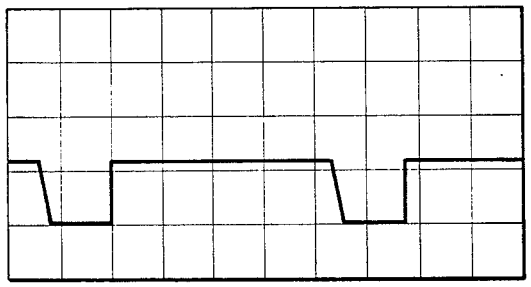
FIGS. 4a and 4b are respectively the theoretical and actual operating voltage waveforms for the rectifying diode in the zero-voltage-switched quasi-resonant converter of FIG. 3.
Figure 4B:
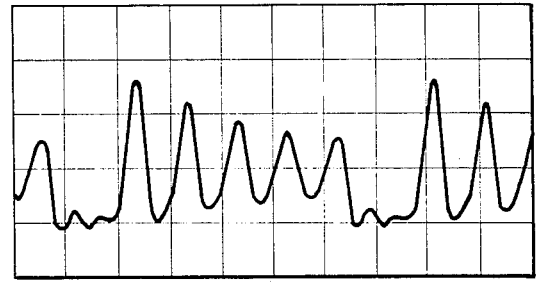
Figure 14:
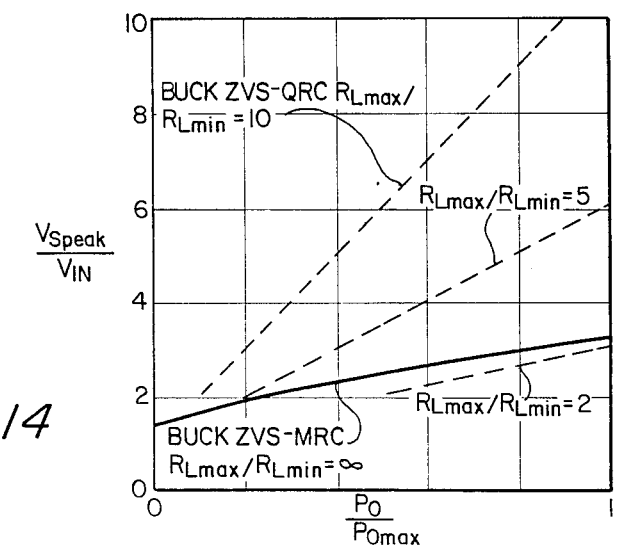
FIG. 14 is a graph showing a comparison of transistor voltage stress in the buck ZVS-QRC of FIG. 3 and the buck ZVS-MRC of FIG. 9.

The low voltage stress with a very wide load range is one of the salient features of ZVS-MRCs. FIG. 14 shows typical normalized transistor voltage stresses in a buck ZVS-QRC (dotted lines) (FIG. 3) and the buck ZVS-MRC 16 (solid line). The voltage stress in the quasi-resonant converter is proportional to the load range. For the converter with 10:1 load range (top dotted line), the voltage stress at full load is 11 times the input voltage. The multi-resonant converter achieves operation from no-load to full-load with the voltage stress only about three times the input voltage.

The ZVS-MRC described represents one of the preferred embodiments of practicing the invention. However, there are other preferred embodiments for operating a ZVS-MRC. An interesting mode of operation is described below.

Figure 1B:
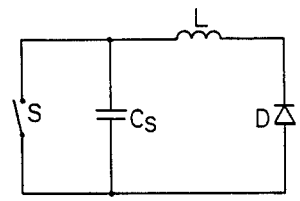
FIG. 1b is a schematic diagram of an equivalent circuit of a zero-voltage quasi-resonant switch.
Figure 2:
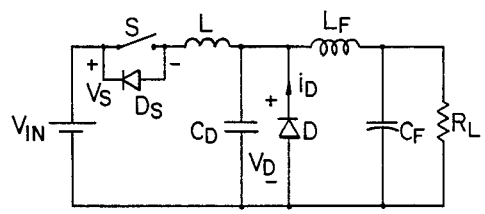
FIG. 2 is a schematic circuit diagram of a buck zero-current-switched quasi-resonant converter.
Figure 15:
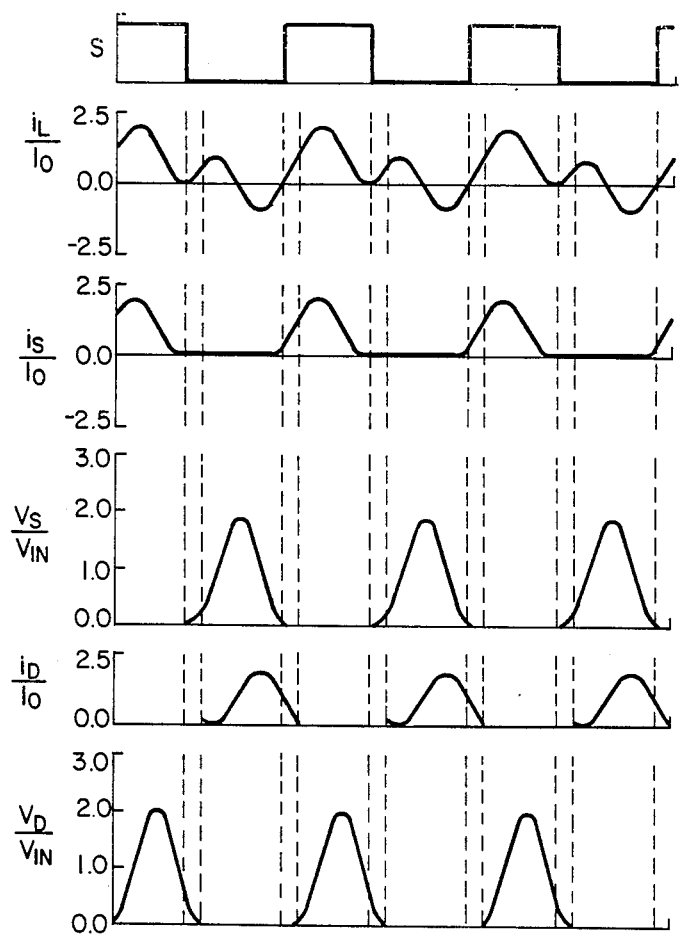
FIG. 15 shows the theoretical waveforms for the buck ZVS-MRC of FIG. 9, for $C_D/C_S=1$, $I_N=1$, $f_N=0.5$.

It is observed that during Mode B, the equivalent resonant circuit is identical to that of ZCS-QRCs, shown in FIG. 1a. Similarly, during Mode D, the equivalent resonant circuit is identical to that of ZVS-QRCs, shown in FIG. 1b. As explained previously, in ZCS-QRCs the transistor switches at zero-current, while the diode switches at zero-voltage. In ZVS-QRCs, the transistor switches at zero-voltage, while the diode switches at zero-current. Under these conditions, the present invention contemplates using the multi-resonant switch to provide switching conditions where both the current and voltage are simultaneously zero for both the transistor and diode, at both turn-on and turn-off. FIG. 15 shows theoretical waveforms of the buck ZVS-MRC of FIG. 9 with $C_D/C_S=1$, $I_N=1$, $f_N=0.5$ and $M=0.5$. It can be seen that both the transistor and diode operate with almost perfect zero-current and zero-voltage switching. This mode of operation would be extremely desirable at high frequencies. However, to operate the circuit in this fashion, it is necessary to keep all operating conditions fixed, which reduces its practical value. This unusual mode of operation was verified experimentally, but the converter was very sensitive to the operating conditions and difficult to control.

Figure 16:
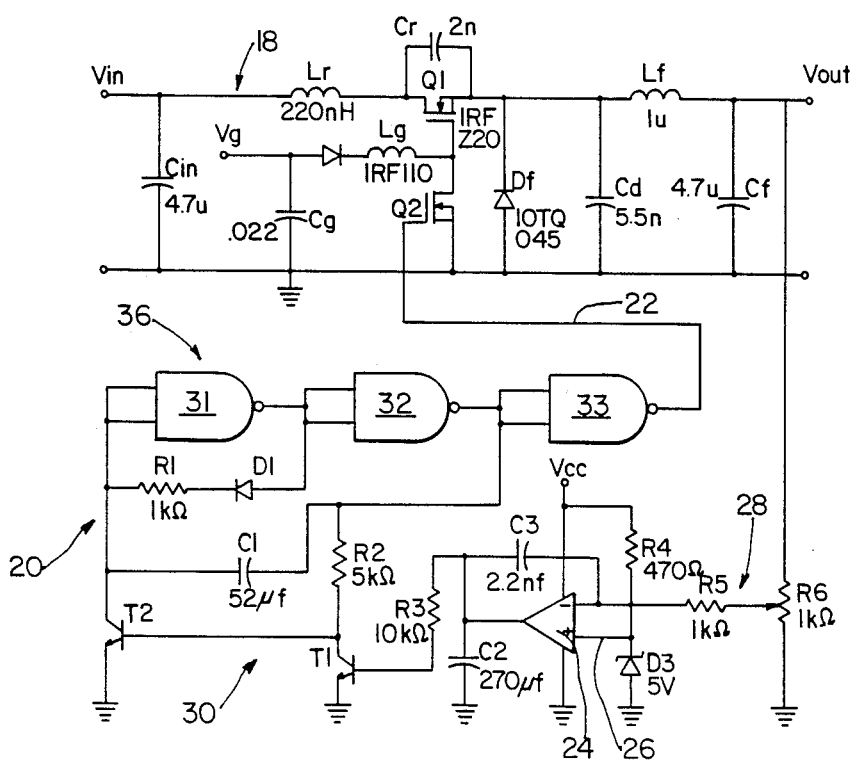
FIG. 16 is a schematic circuit diagram of a preferred embodiment for the buck ZVS-MRC.
Figure 17A:
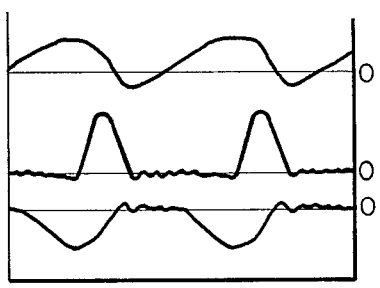
FIGS. 17a through 17d are operating waveforms for the buck ZVS-MRC of FIG. 16.
Figure 17B:
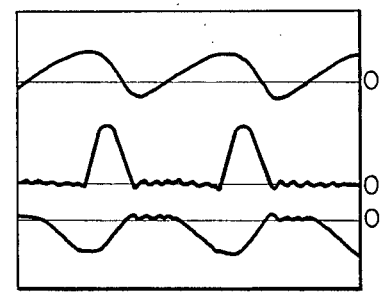
Figure 17C:
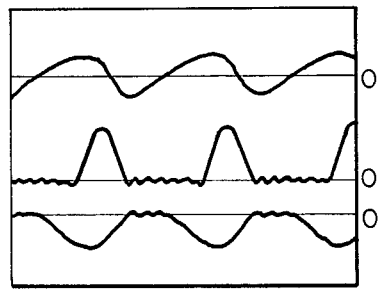
Figure 17D:
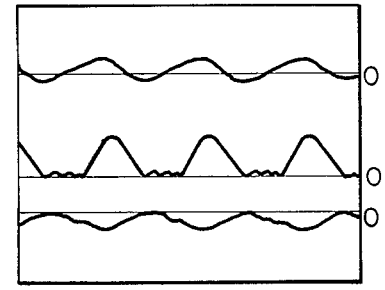

FIG. 16 shows a preferred embodiment of a buck ZVS-MRC 18 incorporating the teachings of the present invention and being operated by a single-loop control 20.

The elements found in the multi-resonant circuit 16 generally correspond to those found in the multi-resonant circuit shown in FIG. 9. Switch S of FIG. 9 is formed by the arrangement of MOSFET $Q_1$ and MOSFET $Q_2$. Capacitance $C_S$ of FIG. 9 is represented through capacitor $C_r$ which is arranged across the drain and source of transistor $Q_1$ in FIG. 16. Diode D and capacitor $C_d$ of FIG. 9 are represented by the parallel arrangement of diode $D_f$ and capacitor $C_d$ in FIG. 16. Finally, the output voltage $V_O$ of FIG. 9 is denoted as $V_{OUT}$ in FIG. 16.

The gate of transistor $Q_2$ receives the output of the single-loop control 20 on line 22. This, in turn, causes $Q_2$ to turn on which then places a current across the gate of $Q_1$ in order to activate the switch S.

The single-loop control consists of an operational amplifier 24 configured as an error amplifier with capacitors $C_2$ and $C_3$ for receiving a reference voltage at the plus-input of the op-amp 24 on line 26. The minus-input of the op-amp receives the $V_{OUT}$ signal after passing through a voltage divider 28 formed by resistors $R_5$ and $R_6$. The output of the op-amp then controls a voltage-controlled oscillator 30 formed in part by transistors $T_1$ and $T_2$ and gates 31 and 32 after passing through resistor $R_3$. The output of the oscillator passes through NAND gate 33 in order to provide the signal on line 22 for turning the transistor $Q_2$ on and off.

The error voltage produced by the op-amp 24 is used to control the VCO 30 which provides constant off-time and variable on-time for transistor $Q_1$. MOSFET $Q_1$ is driven by a quasi-resonant gate drive formed by transistor $Q_2$, inductor $L_g$ and diode $D_g$.

The capacitance 18 is designed for a conversion ratio $C_D/C_S$ approximately equal to 3 and operated with $V_{IN}=15$ V, $V_o=7.5$ V and a maximum output power of 20 W. FIGS. 17a through 17d show waveforms of the converter 18 for various output power levels. The multi-resonant nature of the circuit's operation can be easily seen. The measurement results are shown in Table I. The converter 18 was operated at 4.3 MHz at full-load with an efficiency of 75.4%. At an output power of 0.75 W (3.75% of full-load), the switching frequency increased to 7.33 MHz. Taking into consideration this wide load range, the range of frequency modulation is relatively narrow. The voltage stress was less than 37 V for all loads. The maximum current stress to the transistor was 4.3 A at full-load. This current stress is approximately 1.6 times higher than that of a buck ZVS-QRC, resulting in increased conduction losses. However, substantial reduction of the voltage stress achieved by multi-resonant operation allows usage of MOSFETs with lower breakdown voltage and lower on-resistance. This helps to reduce conduction losses.

TABLE I

| | Mesurement Results Of Buck ZVS-MRC $V_{IN} = 15$ V, $V_o = 7.5$ V | | | | | | |
|---|---|---|---|---|---|---|---|
| f (MHz) | $I_o$ (A) | $I_{IN}$ (A) | $P_o$ (W) | $P_{IN}$ (W) | $\eta$ (%) | $V_{DSpeak}$ (V) | $I_{Dpeak}$ (A) |
| 4.30 | 2.67 | 1.77 | 20.03 | 26.55 | 75.4 | 37.0 | 4.30 |
| 4.72 | 2.00 | 1.39 | 15.00 | 20.85 | 71.9 | 35.5 | 3.90 |
| 5.20 | 1.36 | 1.06 | 10.20 | 15.90 | 64.2 | 33.0 | 3.50 |
| 5.62 | 0.66 | 0.64 | 4.95 | 9.60 | 51.6 | 30.0 | 3.05 |
| 7.33 | 0.10 | 0.11 | 0.75 | 1.65 | 45.5 | 18.0 | 1.25 |

Figure 18:
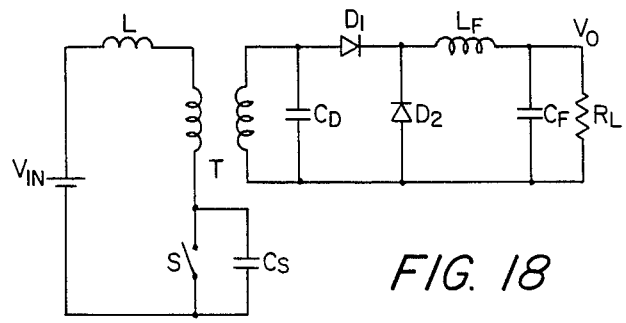
FIG. 18 is a schematic diagram of a forward ZVS-MRC incorporating the teachings of the present invention.

Application of the teachings of the present invention to a forward zero-voltage-switched multi-resonant converter (ZVS-MRC) is generally shown in the isolated topology of FIG. 18. The forward topology is difficult to implement using the zero-voltage-switched quasi-resonant technique because the rectifying diode hinders the discharging of the resonant capacitor. It prevents the switch voltage from reducing to zero before the switch is turned on. In the forward ZVS-MRC, the resonant circuit consists of capacitance $C_S$ in parallel with the switch S, resonant inductance L formed by the leakage inductance of the transformer T and resonant capacitance $C_D$ placed at the secondary side of the transformer. When one of the rectifying diodes ($D_1$, $D_2$) is conducting, the other is reverse-biased and is connected in parallel with $C_D$. Therefore, the junction capacitances of the diodes can be considered part of the resonant capacitance $C_D$.

The resonant capacitor $C_D$ at the secondary side of the transformer T provides a path for reverse flow of current through the transformer and allows the voltage across the active switch S to reduce to zero for lossless turn-on. The flux reset mechanism in the forward ZVS-MRC is similar to that of the forward ZCS-QRC with secondary-side resonance and is provided by the secondary resonant capacitor. This eliminates the reset winding usually required in the conventional forward converter.

Figure 19A:
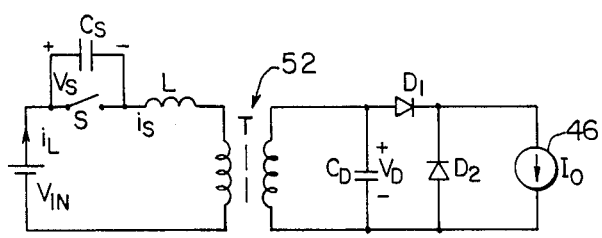
FIGS. 19a through 19d are schematic diagrams showing topological variations of a forward ZVS-MRC incorporating the teachings of the present invention.

The forward ZVS-MRC is derived from the buck ZVS-MRC in much the same way as a PWM forward converter is derived from a PWM buck converter. FIG. 19a shows a basic forward ZVS-MRC topology arising when a transformer T and a forward diode $D_1$ are added to the buck topology such as that shown in FIG. 7a. The load 42 and LC output filter 44 are modeled by a constant current source 46.

Figure 19B:
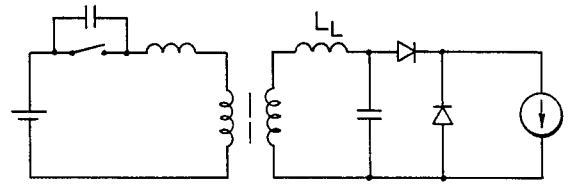

The forward ZVS-MRC topology has the capability of incorporating all major parasitic reactances associated with the components of the power circuit. The output capacitance of the power MOSFET used for switch S supplies part or all of the primary resonant capacitance. Since the resonant-inductor current flows through the transformer T and the secondary resonant capacitor $C_D$, both the primary and secondary leakage inductances $L_L$ of the transformer are included in the resonant tank circuit, as shown in FIG. 19b.

Figure 19C:
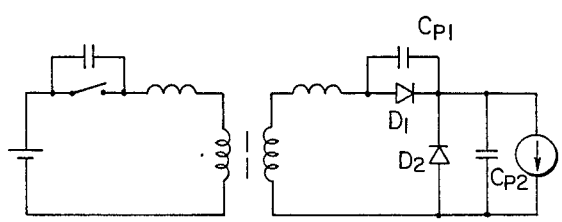
Figure 19D:
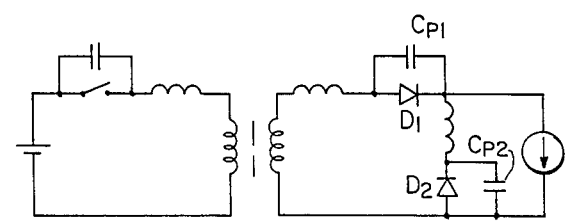

For high-frequency operation, it is desirable to operate the rectifier in such a manner that the junction capacitances $C_j$ of the diodes $D_1$ and $D_2$ are effectively used in the resonant circuit. In the foward ZVS-MRC, the junction capacitances of the diodes can be absorbed by the secondary resonant capacitance. When the secondary voltage is positive, the forward diode is conducting and the secondary resonant capacitance is in parallel with the reverse-biased freewheeling diode. Similarly, when the secondary voltage is negative, the freewheeling diode is conducting and the resonant capacitance is in parallel with the reverse-biased forward diode. Therefore, the junction capacitances of the diodes are incorporated in the resonant circuit. In fact, operation of the circuit does not change if the resonant capacitance is provided exclusively by capacitances $C_{p1}$ and $C_{p2}$ in parallel with the diodes $D_1$ and $D_2$, as shown in FIG. 19c. If the junction capacitances of the rectifiers are sufficiently large, they can provide all of the secondary resonant capacitance. In such a case, the package and wiring inductances of the rectifiers can be entirely absorbed by the resonant inductance, as shown in FIGS. 19d.

Figure 20:
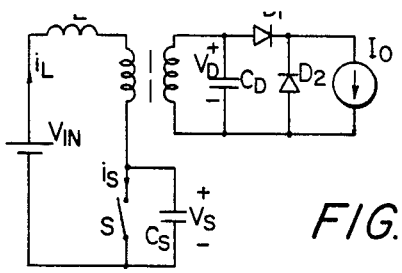
FIG. 20 shows a schematic circuit diagram for a preferred embodiment of the forward ZVS-MRC.
Figure 21:
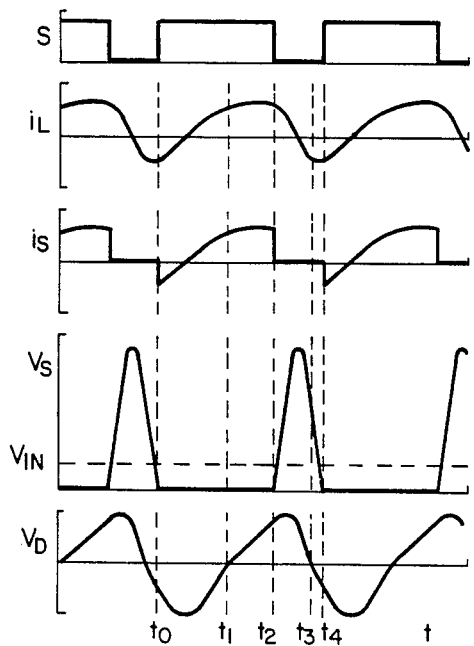
FIG. 21 shows the typical operating waveforms for the forward ZVS-MRC of FIG. 20.
Figure 22A:
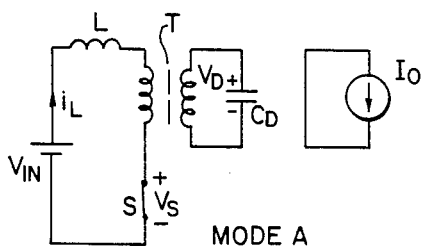
FIGS. 22a through 22d are schematic diagrams showing the topological modes of the forward ZVS-MRC of FIG. 20.
Figure 22B:
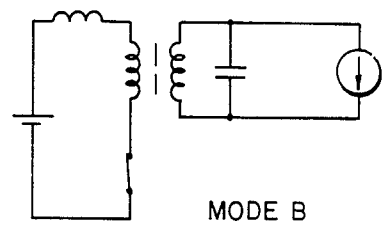
Figure 22C:
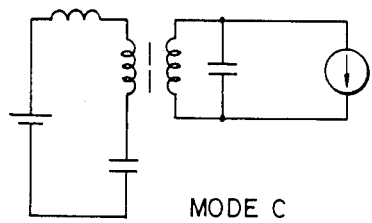
Figure 22D:
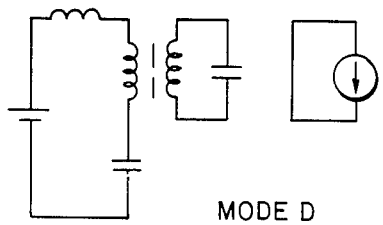

FIG. 20 shows a prefered arrangement of the foward ZVS-MRC FIG. 21 shows the operational waveforms for the forward ZVS-MRC of FIG. 20. Operation of the forward ZVS-MRC is different from that of a buck ZVS-MRC. Due to the presence of the forward diode $D_1$, the voltage across the secondary-side resonant capacitance $C_D$ can be both positive and negative, thus, providing an automatic transformer reset mechanism similar to that of the secondary-side-resonant forward ZCS-QRC. The volt-second across resonant capacitance $C_D$ is equal to the volt-second applied to the transformer T. If the net volt-second applied to the transformer is positive during one cycle, it causes the magnetizing current in the transformer to increase. The increase of the magnetizing current causes the resonant capacitance $C_D$ to be charged more negatively during the next cycle which will subsequently decrease the magnetizing current. This automatic reset mechanism eliminates the need for an external reset circuit. However, the transformer is not optimally utilized due to a DC core bias.

During one switching cycle, the forward converter 52 operates in four topological modes, shown in FIGS. 22a through 22d, where the time intervals $t_0$ through $t_4$ are shown with reference to FIG. 21.

In topological Mode A ($t_0$, $t_1$) the switch S is turned on at $t_0$ with $v_S = 0$ and $V_D < 0$. Resonance of inductor L and capacitance $C_D$ cause current $i_L$ to increase. Combined currents of the resonant inductor and magnetizing inductance charge voltage $V_D$ to zero causing diode $D_1$ (FIG. 20) to turn on and diode $D_2$ to turn off.

During topological Mode B ($t_1$, $t_2$) conduction of switch S continues. The resonant circuit is still formed by inductor L and resonant capacitor $C_D$, but the rate at which voltage $V_D$ increases is reduced because part of the resonant current is flowing through the load. This stage ends when switch S is turned off at $t_2$.

After switch S is turned off, the circuit enters topological Mode C ($t_2$, $t_3$), where the resonant circuit is formed by all three resonant components. During this mode, voltage $V_S$ reaches its peak value. The secondary voltage reduces to zero turning diode $D_1$ off and diode $D_2$ on.

During topological Mode D ($t_3$, $t_4$), the voltage $v_S$ across the switch S is reduced to zero. The cycle is completed when the switch is turned on at $t_4$.

Figure 23:
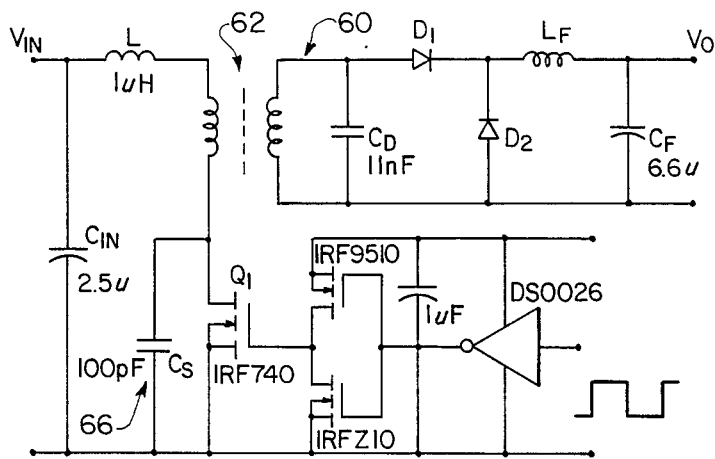
FIG. 23 is a circuit diagram of a specific embodiment of the forward ZVS-MRC of FIG. 20.

A 50 W forward ZVS-MRC incorporating the teachings of the present invention was implemented with a 50 V input and a 5 V output voltage. A circuit diagram of the converter 60 is shown in FIG. 23.

The transformer 62 with a 4:1 turns ratio had a core using 4C4 Ferroxcube Ni-Zn ferrite. Approximately one-third of the resonant inductance was supplied by the leakage of the transformer. The remaining two-thirds were supplied by an external inductor. The output capacitance of the IRF740 MOSFET $Q_1$ provided approximately half of the required primary resonant capacitance. An external capacitor 66 of 100 pF was added in parallel with the transistor $Q_1$. One-third of the secondary resonant capacitance was supplied by the junction capacitances of the Schottky rectifiers $D_1$ and $D_2$. An external ceramic capacitor was added in parallel with the rectifiers to obtain the required capacitance.

TABLE II

| Measurement Results Of Forward ZVS-MRC at $V_{IN} = 50$ V | | | | | |
| --- | --- | --- | --- | --- | --- |
| f MHz | $I_o$ A | $I_{IN}$ A | $P_o$ W | $P_{IN}$ W | $\eta$ % |
| 4.83 | 10 | 1.26 | 50 | 60.3 | 79.4 |
| 5.95 | 5 | 0.69 | 25 | 34.5 | 72.4 |
| 7.22 | 0 | 0.06 | 0 | 3.0 | 0.0 |

The converter 60 operated at frequencies in excess of 5 MHz. Regulation characteristics at a 50 V input voltage are shown in FIG. 24c for various load resistances. It can be seen that the converter achieves substantial range of the output voltage regulation for a wide load range with a relatively narrow switching frequency range. Zero-voltage turn-on is maintained for all operating conditions.

Figure 24A:
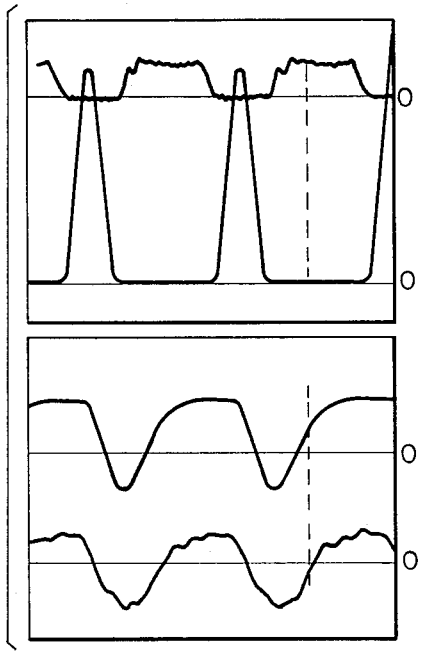
FIGS. 24a and 24b show the measured waveforms for the forward ZVS-MRC of FIG. 23.
Figure 24B:
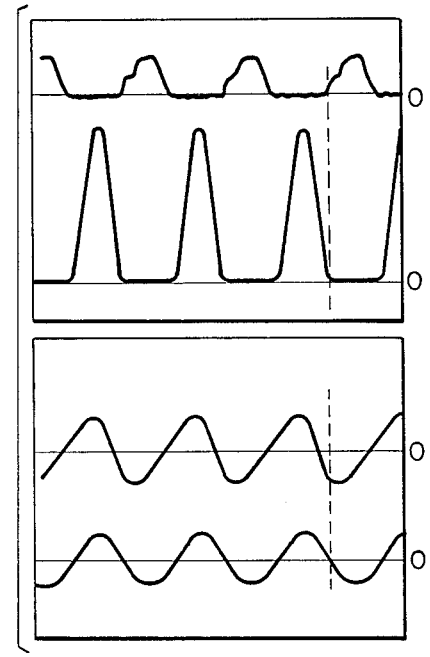
Figure 24C:
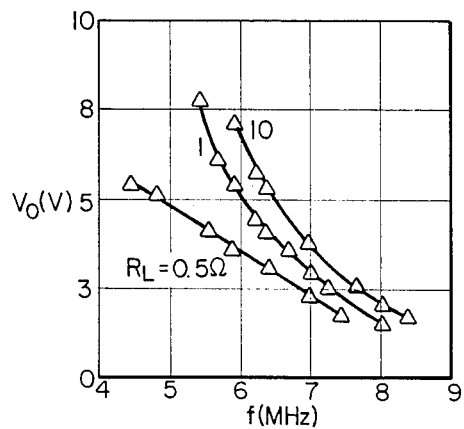
FIG. 24c shows the measured output voltage versus the switching frequency of the forward ZVS-MRC of FIG. 23 with $V_{IN}=50$ V.

Waveforms of the converter 60 operating at 50 V input and 5 V output voltage at full-load and no-load are shown in FIGS. 24a and 24b. The converter operated with clean waveforms and zero-voltage switching at all loads. Measurement results are shown in Table II. At the full-load of 50 W, the converter achieved an efficiency of 79.4%. At medium and light loads, the efficiency is reduced due to circulating currents.

Improvement in the operation of ZVS-MRCs is obtained with synchronous rectification which is achieved by replacing rectifying diodes in a DC/DC converter with active devices, call synchronous rectifiers. Typically, synchronous rectifier uses a low-on-resistance MOSFET device operating in a reverse-saturated region. The advantage of synchronous rectification over conventional rectification using diodes is lower power dissipation accomplished by using devices with low on-resistance resulting in lower voltage drop across the synchronous rectifier than the corresponding voltage drop across a diode.

Since a synchronous rectifier is an active device, it requires a drive circuit similar to that used to operate a power MOSFET. This results in an undesirable complication of the converter circuitry. To control a synchronous rectifier, its input capacitance has to be charged and discharged. Typically, this results in a power dissipation in the drive circuit proportional to the input capacitance of the synchronous rectifier and the switching frequency. At high switching frequencies, power dissipation in the drive circuit may become comparable or even larger than the power dissipation saved by replacing a diode with a synchronous rectifier.

The aforementioned disadvantages of synchronous rectification can be overcome if the synchronous rectifier is used in a circuit that uses the capacitance of the rectifier as a resonant component. The zero-voltage-switched multi-resonant forward converter is an example of such a circuit. FIGS. 25a through 25c show the forward ZVS-MRC with synchronous rectifiers and various positions of the resonant capacitors. Diodes $D_1$ and $D_2$ can be implemented using internal body diodes of synchronous rectifiers $Q_1$ and $Q_2$, respectively. External diodes (preferably Schottky rectifiers) can be used to implement $D_1$ and $D_2$ to reduce conduction losses during switching of the synchronous rectifiers when neither $Q_1$ nor $Q_2$ conducts.

FIG. 25a shows a configuration where the external resonant capacitor $C_3$ is placed across the secondary winding of the transformer T. FIG. 25b shows a configuration where two resonant capacitors $C_1$ and $C_2$ are placed one across each rectifier $Q_1$ and $Q_2$. FIG. 25c shows the most general configuration where resonant capacitor $C_3$ is placed across the secondary winding and capacitors $C_1$ and $C_2$ are placed across the rectifiers.

As noticed in FIG. 25c, all of parasitic capacitances of the synchronous rectifier are in consistence with the resonant capacitances and, therefore, can supply part or all of the required resonant capacitance. In particular:

Capacitance $C_3$ is partially or totally formed by:
gate-to-drain capacitance $C_{gd}$ of $Q_1$;
gate-to-drain capacitance $C_{gd}$ of $Q_2$.
Capacitance $C_1$ is partially or totally formed by:
output capacitance $C_{ds}$ of $Q_1$;
input capacitance $C_{gs}$ of $Q_2$;
junction capacitance of diode $D_1$.
Capacitance $C_2$ is partially or totally formed by:
output capacitance $C_{ds}$ of $Q_2$;
input capacitance $C_{gs}$ of $Q_1$;
junction capacitance of diode $D_2$.

FIG. 26 shows operating waveforms of a forward ZVS-MRC with synchronous rectifiers such as that shown in FIG. 25c. The top waveform, $v_{sec}$, is the voltage across the secondary winding of the transformer T, $V_{Q2}$ is the voltage across the rectifier $Q_2$ and $V_{Q1}$ is the voltage across the rectifier $Q_1$. The two bottom waveforms of FIG. 26 show the on and off states of the synchronous rectifiers $Q_2$ and $Q_1$, respectively. It should be noticed that voltage $v_{Q1}$ is applied between the gate and the source of rectifier $Q_2$ and, therefore, controls rectifier $Q_2$. Similarly, voltage $v_{Q2}$ controls rectifier $Q_1$.

The operation of the rectifier is as follows. When $V_{sec}$ crosses zero, $t_1-t_2$, magnitudes of the voltages applied to the inputs of the synchronous rectifiers $Q_1$ and $Q_2$ are too low to turn on either of them. In a preferred embodiment, both synchronous rectifiers are p-channel MOSFET devices, therefore, they are on if the voltage applied between the gate and the source is negative, with a magnitude larger than a threshold voltage $V_T$. During this stage, none of the synchronous rectifiers is conducting. The output current flows through diodes $D_1$ and $D_2$. The exact distribution of the current between diodes $D_1$ and $D_2$ depends on the values of capacitors $C_1$, $C_2$ and $C_3$, but, in general, the output current is switched from diode $D_2$ to diode $D_1$. At $t_2$, the output current flows through diode $D_1$, $D_2$ is reverse-biased and voltage, $v_{Q2}$, is equal to the threshold voltage necessary to turn on rectifier $Q_1$. Therefore, rectifier $Q_1$ starts conducting at $t_2$ and is on until $v_{Q2}$ reduced below $V_T$ at $t_2$ is turned on. $Q_2$ is conducting until $t_5$ when magnitude of $v_{Q1}$ reduces below $V_T$.

It can be seen from FIG. 26, that the operation of the circuit 60 provides automatic control of the synchronous recitifiers without any additional circuitry to implement gate drives for rectifier $Q_1$ and $Q_2$. Moreover, the input capacitances, as well as all other parasitic capacitances of the synchronous rectifiers, are used in the resonant circuit. Therefore, the power dissipation related to charging and discharging these capacitances can be totally eliminated. Both rectifiers $Q_1$ and $Q_2$ are always turned on during conduction of the parallel diodes ($D_1$ or $D_2$) resulting in zero-voltage-switching and elimination of dissipation of the energy stored in capacitors $C_1$ and $C_2$. In general, the synchronous rectifier configuration described above can eliminate all losses related to the parasitic capacitances of the synchronous rectifiers.

Figure 27:
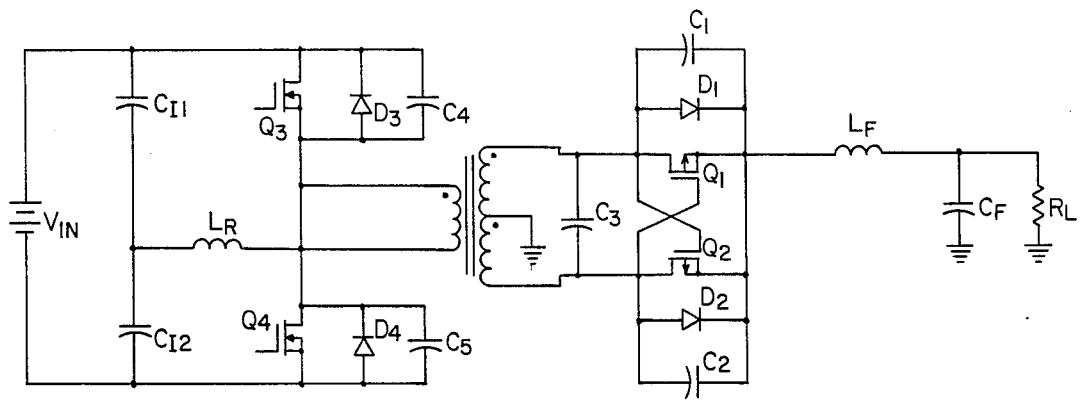
FIG. 27 is a schematic diagram showing an alternative embodiment of the subject invention applied to a zero-voltage-switched multi-resonant half-bridge converter.

The idea described above can be applied also to the zero-voltage-switched multi-resonant half-bridge converter, as shown in FIG. 27.

To make the above-described configuration of the synchronous rectifier practical, the following requirements for the devices used for rectifiers $Q_1$ and $Q_2$ should be fulfilled as follows:

The on-resistance of the device should be low enough to produce voltage drop during conduction less than a corresponding voltage drop across a Schottky diode.

The device should be turned on by a negative voltage applied between the input terminal and the common terminal (gate-to-source voltage if a p-channel MOSFET device is used).

The resistance associated with the input capacitance of the device (gate resistance if a p-channel MOSFET device is used) should be low enough, so that currents flowing through this capacitance do not cause excessive power dissipation.

The magnitude of the threshold voltage $V_T$ required to turn on the device should be lower (for practical operation—substantially lower) than the peak value of voltage $v_{sec}$.

One disadvantage of the synchronous rectifier arrangements shown in FIGS. 25a through 25c and 27 is the requirement that the device is on when the control voltage (gate-to-source voltage) is negative. This requires using p-channel MOSFET devices, which have substantially higher on-resistance than corresponding n-channel devices. N-channel MOSFETs are on when the gate-to-source voltage is positive.

Figure 28:
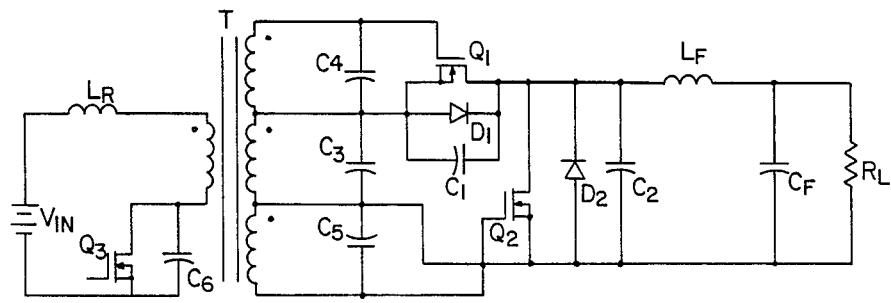
FIGS. 28 and 29 are schematic diagrams showing alternative embodiments of the subject invention applied to a forward ZVS-MRC and half-bridge ZVS-MRC with n-channel synchronous rectifiers.
Figure 29:
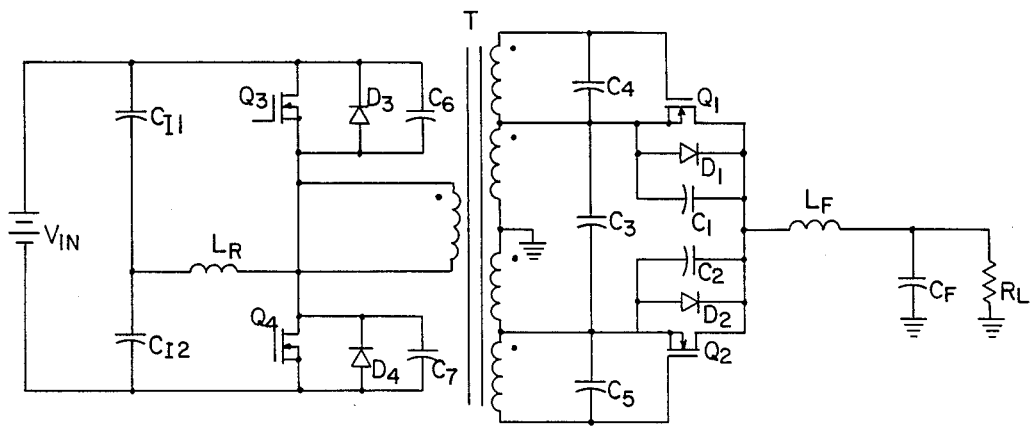

FIGS. 28 and 29 show circuit diagrams of a forward ZVS-MRC and half-bridge ZVS-MRC with n-channel synchronous rectifiers, respectively. To provide appropriate polarity of the gate-to-source voltage, the gates of the synchronous rectifiers $Q_1$ and $Q_2$ are connected to additional windings on the power transformer T. The resonant capacitance required for multi-resonant operation is now comprised by capacitors $C_1$ to $C_5$. Capacitors $C_4$ and $C_5$ are formed partially or completely by input capacitances of the synchronous rectifiers $Q_1$ and $Q_2$. Operation of circuits of FIGS. 28 and 29 also can provide complete elimination of losses related to parasitic capacitances of the synchronous rectifiers.

A 50 W forward ZVS-MRC was also implemented with an input voltage of 50 V and an output voltage of 5 V. The converter operated with an efficiency of 80% at full-load. The load varied from 2.5 W at 8.5 MHz to 50 W at 5 MHz which corresponds to 5% to 100% load range. Zero-voltage-switching was maintained for all loads with maximum voltage stress to the switching transistor of 250 V.

A novel, multi-resonant switch concept is proposed to overcome the limitations of high-frequency quasi-resonant converters. A new family of zero-voltage-switching multi-resonant converters is generated. The new converters operate with favorable switching conditions for both the transistor and rectifying diode. Transistor voltage stress in ZVS-MRCs is significantly reduced compared to that in ZVS-QRCs, while the load range is dramatically improved. By limiting the switching frequency range, the ZVS-MRCs can avoid instability found in ZVS-QRCs caused by the parasitic oscillation between the junction capacitance of the rectifier and the resonant inductance. In fact, in ZVS-MRCs, the junction capacitance of the rectifier is used as a part of the resonant circuit. As a result, high-current diodes with large junction capacitance can be used to reduce conduction losses in the rectifier. Due to the unique arrangement of the resonant circuit that absorbs all parasitic reactances including transistor output capacitance, diode junction capacitance and transformer leakage inductance, the ZVS-MRCs are suitable for high-density on-board and off-line power supplies operating above one MHz.

From the above, it is apparent that many modifications and variations of the present invention are possible in light of the above teachings. It is therefore to be understood that, within the scope of the appended claims, the invention may be practiced otherwise than as specifically described.

What is claimed is:

1. A zero-voltage-switched multi-resonant converter comprising:
    switching means operative in open and closed circuit positions;
    first resonant capacitor means in parallel with said switching means;
    rectifying diode means in series with said switching means, said rectifying means and said switching means forming a closed-loop;
    second resonant capacitor means in parallel with said rectifying diode means; and
    inductor means inserted in said closed loop for forming a resonant circuit with the first and second resonant capacitor means.

2. The converter of claim 1, wherein said rectifying diode means comprises a synchronous rectifier.

3. A zero-voltage-switched multi-resonant converter comprising:
    switching means operative in open and closed circuit positions;
    first resonant capacitor means in parallel with said switching means;
    rectifying diode means;
    second resonant capacitor means in parallel with said rectifying diode means; and
    inductor means for forming a resonant circuit with said first and second resonant capacitor means.

4. The converter of claim 3, wherein said inductor means is inserted in series with said first and second resonant capacitor means, such that a first terminal of said inductor means is connected to said first resonant capacitor means, and a second terminal of said inductor means is connected to said second resonant capacitor means.

* * * * *